C. B. BROWN.
Grain-Drill.
No. 19,617. Patented Mar. 16, 1858.
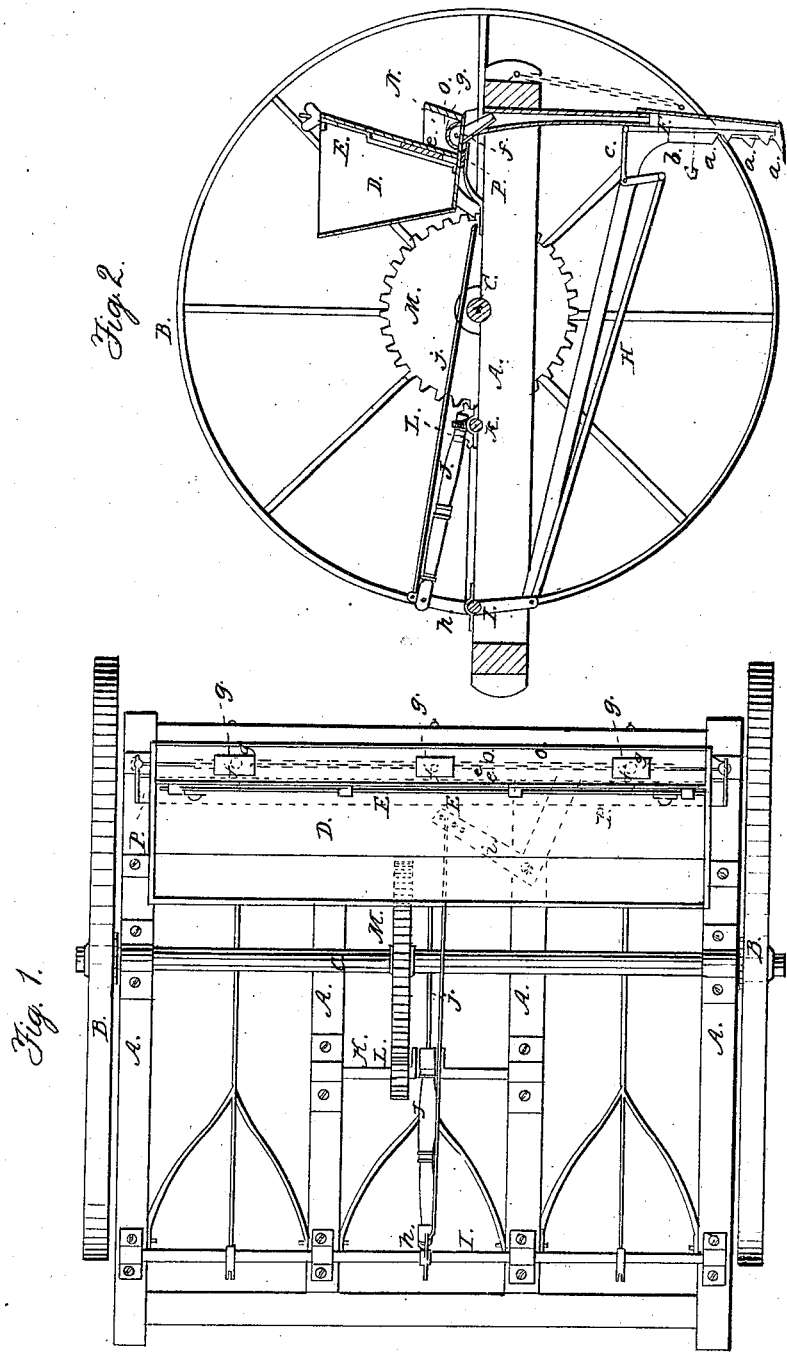

UNITED STATES PATENT OFFICE.

C. B. BROWN, OF ALTON, ILLINOIS.

IMPROVEMENT IN SEED-DRILLS.

Specification forming part of Letters Patent No. 19,617, dated March 16, 1858.

*To all whom it may concern:*

Be it known that I, C. B. BROWN, of Alton, in the county of Madison and State of Illinois, have invented a new and useful Improvement in Seed-Drills; and I do hereby declare that the following is a full, clear, and exact description of the same, reference being had to the accompanying drawings, forming part of this specification, in which—

Figure 1 is a top or plan view of a seed-drill constructed after my invention. Fig. 2 is a vertical longitudinal section of the same.

Similar letters of reference in each of the several figures indicate corresponding parts.

The nature of my invention consists, first, in the employment of vertical vibrating serrated blades, in combination with the slitted, flanged, or serrated drill-teeth, in the peculiar manner hereinafter specified, for the purpose of cutting up and removing any weeds, grass, or stubble that may collect about and hang on the front of the drill-teeth while planting in foul ground.

It consists, second, in the combination of the seed-distributer and clearing-blades and propelling-axle by means of a double-acting rock-shaft, three connecting-rods, two elbow-levers, a crank-shaft, and transverse slide, and two spur-wheels, in the peculiar manner presently described.

To enable others skilled in the art to make and use my invention, I will proceed to describe its construction and operation.

A represents the frame; B B, the propelling-wheels; C, the axle; D, the main hopper, and E, a gage-board or gate attached to the back of the hopper for the purpose of regulating the escape of grain from the same.

F F represent the drill-teeth. They are hung in the usual manner to the frame A, but are peculiar in their construction, being slitted down their front from top to bottom, and furnished with guards or V-shaped flanges $a\ a$, on each side of the slits $b\ b$, as shown. Within these slits serrated blades G G, with plane or sickle cutting-edges, are arranged to vibrate up and down freely, said blades being pivoted to elbow-lever $c$, which has its fulcrum on the upper end of the teeth, as shown. These blades, by vibrating up and down and acting in concert with the V-flanges or stationary guards $a\ a$ of the drill-teeth, cut up and clear away all stubble, grass, or weeds which may collect on the front of the drill-teeth. Motion is imparted to the blades from the propelling-wheels B through intermediate gearing, consisting of a connecting-rod, H, rock-shaft I, connecting-rod J, crank-shaft K, and bevel-gears L M, arranged as shown.

N is an auxiliary hopper for equalizing the grain on the seed-distributer. It is arranged with its bottom on the same inclined plane with the main hopper, and connected with the same by means of a perforated partition, $e$, the perforations of which are covered to a greater or less extent by the gage-board or gate E. This auxiliary hopper has a hole, $f$, through its bottom for each drill-tooth, said holes being covered by arch-shaped caps $g\ g$, as shown. Over the holes and under the arch-caps a chain, O, is arranged to vibrate freely. This chain receives the grain as it falls from the main hopper, and carries it under the arch-caps and drops it into the drill-teeth through the holes $f\ f$. The vibrating motion to the chain is imparted by means of a transverse slide or strip, P, which is arranged below the bottom of the main hopper, and connected to the upper arm, $h$, of the rock-shaft I by means of a horizontal elbow-lever, $i$, and connecting-rod $j$, as shown. By thus connecting the chain seed-distributer to the rock-shaft, one rock serves for operating it simultaneously with the drill-teeth clearers, both being actuated by the propelling-wheels through their appropriate intermediate connections, as shown in the drawings.

What I claim as my invention, and desire to secure by Letters Patent, is—

1. The employment of vertical vibrating serrated blades G, in combination with the slitted, flanged, or serrated drill-teeth F, substantially as and for the purposes set forth.

2. The combination of the seed-distributer O and clearing-blades G and propelling-axle C, by means of a double-acting rock-shaft, I, three connecting-rods, H J $j$, two elbow-levers, $c\ i$, a crank-shaft, K, and transverse slide P, and two spur-wheels, L M, substantially as and for the purpose set forth.

C. B. BROWN.

Witnesses:
RICHARD EMERSON,
PHILIP ERTES.